US012697676B2

(12) United States Patent
Kueper et al.

(10) Patent No.: US 12,697,676 B2
(45) Date of Patent: Aug. 4, 2026

(54) METHOD FOR DETERMINING STATE-RELATED INFORMATION, FOR EXAMPLE WEAR-RELATED INFORMATION, CONCERNING AN ULTRASONIC WELDING DEVICE

(71) Applicant: SCHUNK SONOSYSTEMS GMBH, Wettenberg (DE)

(72) Inventors: Michael Kueper, Giessen (DE); Manuel Fey, Wetzlar (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 71 days.

(21) Appl. No.: 18/579,004

(22) PCT Filed: Jul. 16, 2021

(86) PCT No.: PCT/EP2021/070017
§ 371 (c)(1),
(2) Date: Jan. 12, 2024

(87) PCT Pub. No.: WO2023/284981
PCT Pub. Date: Jan. 19, 2023

(65) Prior Publication Data
US 2024/0316685 A1     Sep. 26, 2024

(51) Int. Cl.
B23K 20/00     (2006.01)
B23K 20/10     (2006.01)
(52) U.S. Cl.
CPC .................................. B23K 20/10 (2013.01)

(58) Field of Classification Search
CPC . B23K 20/10; B23K 2101/32; B23K 2101/38
See application file for complete search history.

(56) References Cited

U.S. PATENT DOCUMENTS

| | | | | |
|---|---|---|---|---|
| 7,459,653 | B2 * | 12/2008 | Steiner | B23K 11/0026 |
| | | | | 219/56 |
| 8,047,420 | B2 * | 11/2011 | Stroh | H01R 4/625 |
| | | | | 228/110.1 |
| 9,419,490 | B2 * | 8/2016 | Kajita | B23K 20/10 |
| 11,370,056 | B2 * | 6/2022 | Solenthaler | H01R 43/28 |
| 11,424,585 | B2 * | 8/2022 | Schmidt | B23K 37/0443 |

(Continued)

FOREIGN PATENT DOCUMENTS

| | | |
|---|---|---|
| DE | 102016110590 A1 | 12/2016 |
| JP | 20160107292 A | 6/2016 |
| JP | 2018094602 A | 6/2018 |

OTHER PUBLICATIONS

International Search Report, issued Apr. 12, 2022, in corresponding International No. PCT/EP2021/070017, 3 pages.

(Continued)

*Primary Examiner* — Erin B Saad
(74) *Attorney, Agent, or Firm* — Maier & Maier, PLLC

(57)     ABSTRACT
A method for determining condition information for an ultrasonic welding device. The condition information specifies information about the current condition of at least one component of the ultrasonic welding device. The ultrasonic welding device includes, as components, a sonotrode, an anvil, a touching element and/or a lateral slide as well as a receiving chamber defined by the components.

16 Claims, 3 Drawing Sheets

(56)    References Cited

U.S. PATENT DOCUMENTS

| | | | |
|---|---|---|---|
| 2002/0000459 A1* | 1/2002 | Wnek | B23K 20/10 |
| | | | 228/110.1 |
| 2004/0088857 A1* | 5/2004 | Fujimoto | H01R 11/12 |
| | | | 29/871 |
| 2008/0032569 A1* | 2/2008 | Steiner | H01R 43/0207 |
| | | | 228/110.1 |
| 2015/0168942 A1 | 6/2015 | Spicer et al. | |
| 2021/0146470 A1* | 5/2021 | Strobel | B23K 20/10 |
| 2024/0100621 A1* | 3/2024 | Fey | B23K 20/26 |

OTHER PUBLICATIONS

Office Action issued on Mar. 4, 2025, in corresponding Japanese Application No. 2024-501822, 5 pages.

\* cited by examiner (a)

(b)

(c)

(d)

(e)

(f)

(a)

(b)

(c)

METHOD FOR DETERMINING STATE-RELATED INFORMATION, FOR EXAMPLE WEAR-RELATED INFORMATION, CONCERNING AN ULTRASONIC WELDING DEVICE

FIELD

The present invention relates to a method for determining condition information, for example wear information, relating to an ultrasonic welding device. The invention further relates to an ultrasonic welding device which is configured to perform the method as well as a corresponding computer program product and a machine-readable medium storing the same.

BACKGROUND

Ultrasonic welding may be used to join two components together in a mechanically secure and/or electrically conductive manner. For example, it may be necessary for various purposes to join strands of cables together mechanically and in an electrically conductive manner. This makes it possible, for example, to produce wiring harnesses or cable looms which may be used to connect electrical consumers, inside a vehicle for example, to each other, to an energy source and/or to a control system in an electrically conductive manner.

Ultrasonic welding is a special form of friction welding in which components to be welded are brought into surface contact with each other as joining partners and moved against each other under low pressure and high-frequency mechanical vibrations. The vibrations may be generated with the aid of a sonotrode assembly in which ultrasonic vibrations with frequencies of typically 20 kHz to 50 kHz are generated and transmitted to at least one of the joining partners. Plastic flow then allows the joining partners to permeate or interlock with each other close to the surface without the materials of the joining partners necessarily melting. Ultrasonic welding may therefore be used to bond joining partners together with low impact, quickly and economically.

Ultrasonic welding may also be used in particular for welding metal joining partners, such as for welding several strands of cables together, for example, or for welding compacting of individual conductors within a strand, for welding one or more strands to contact elements and/or for welding metal sheets. For this purpose, the joining partners are generally inserted into a receiving chamber of an ultrasonic welding device and then welded together between a sonotrode head of an ultrasonically vibrating sonotrode and an anvil. In this case, the receiving chamber may be defined on opposing sides by further components such as a touching element and a lateral slide.

In ultrasonic welding, wear typically occurs on components of the ultrasonic welding device. For example, friction-induced wear on a surface of one of the components inside the ultrasonic welding device may cause a texture originally provided there to become rounded or otherwise modified so that, for example, ultrasonic vibrations may be less efficiently transmitted to joining partners. The wear may result in welded joints that no longer meet specified requirements. Accordingly, a condition of the components of the ultrasonic welding device should be monitored in order, among other things, to detect such wear in good time. An intervention limit or wear limit may also be defined and it may be detected when such a limit is reached and accordingly maintenance measures are initiated.

Other influences may also affect a mode of operation and/or performance of an ultrasonic welding device. For example, different types of components, i.e. differently designed sonotrodes, anvils, etc. for example, may be used in the ultrasonic welding device in order to adapt it to different application requirements. It may also be advantageous with regard to correct use of such component types to monitor the condition of the ultrasonic welding device.

Conventionally, monitoring of the ultrasonic welding device is usually carried out by a human operator of the device or a maintenance technician. In this case, a technically trained person, for example, may detect excessive signs of wear and consequently, for example, arrange for maintenance of the ultrasonic welding device and/or replacement of a worn component. The person may also identify whether a desired component type is being used in the ultrasonic welding device. However, such monitoring, which has to be carried out by people, involves high staff costs and/or is subject to the risk of human errors. In addition, detecting signs of wear, for example, requires a high level of qualification on the part of the people involved. However, even experienced people are not usually able to precisely identify gradual differences in signs of wear, which means that it is not usually possible to draw a precisely qualified conclusion about a stage of wear. Accordingly, components subject to wear are often replaced at an early stage as a precaution. Alternatively, maintenance measures may be carried out too late, so that welded joints produced with a partially worn ultrasonic welding device may no longer meet predetermined quality criteria. In most cases, it is also hardly possible to make statements about any probable remaining service life of a component.

SUMMARY

There may therefore be a requirement for a method for determining condition information for an ultrasonic welding device, which may be used to overcome or mitigate at least some of the aforementioned deficiencies. In particular, there may be a requirement for a method, which may be used to determine condition information that allows conclusions to be drawn about wear of components and/or about a current configuration of the ultrasonic welding device easily, reliably, precisely and/or cost effectively. In particular, it should preferably be possible to determine the condition information automatically. In addition, there may be a requirement for an ultrasonic welding device which is configured to perform such a method. Furthermore, there may be a requirement for a computer program product, which may be used to instruct an ultrasonic welding device to carry out such a method, as well as for a machine-readable medium on which such a computer program product is stored.

Such a requirement may be met by the subject matter of one of the independent claims. Advantageous embodiments are defined in the dependent claims and the following description and are illustrated in the Figures.

A first aspect of the invention relates to a method for determining condition information for an ultrasonic welding device. In this case, the condition information specifies information about the current condition of at least one component of the ultrasonic welding device. The ultrasonic welding device comprises a plurality of components and a receiving chamber. The components comprise a sonotrode and/or an anvil and/or a touching element and/or a lateral slide. Joining partners are to be accommodated in the receiving chamber. The receiving chamber is defined on a first side by a surface of a first of the components, in particular of the sonotrode, and on a second side opposing the first side by a surface of a second of the components, in particular of the anvil. The receiving chamber is optionally further defined on a third side by a surface of a third of the components, in particular of the touching element, and on a fourth side opposing the third side by a surface of a fourth of the components, in particular of the lateral slide. At least the first of the components and the second of the components opposing the first component are displaceable relative to each other in a first displacement direction toward each other and are displaceable relative to each other in a second displacement direction oriented transverse to the first displacement direction. The first component and the second component are displaceable relative to each other in the first displacement direction in such a manner that a counterforce, which acts on the first component contrary to the first displacement direction, reaches a predetermined maximum force. The method comprises at least the following method steps, preferably in the order specified:

(a) displacing the first component and the second component relative to each other, starting from an initial position, in the first displacement direction and detecting a first stop position at which the counterforce acting on the first component during displacement reaches the predetermined maximum force;

(b) displacing the first component and the second component relative to each other in a second displacement direction into a changed position; and (c) displacing the first component and the second component relative to each other again, starting from the changed position, in the first displacement direction and detecting a second stop position at which the counterforce acting on the first component during displacement reaches the predetermined maximum force;

(d) determining the condition information based on the first and second stop positions detected.

According to a second aspect of the invention, an ultrasonic welding device is described which comprises the structural and functional features previously described for the first aspect and is configured to carry out or control the method according to an embodiment of the first aspect of the invention.

According to a third aspect of the invention, a computer program product is described which comprises instructions which, when executed on a processor, prompt said processor to execute or control an embodiment of the method according to the first aspect of the invention in an ultrasonic welding device according to an embodiment of the second aspect of the invention.

According to a fourth aspect of the invention, a machine-readable medium is described with a computer program product according to the third aspect of the invention stored thereon.

Briefly and roughly summarized, a basic idea regarding the idea described herein may be seen in the fact that a displaceability of the components which define the receiving chamber of the ultrasonic welding device is used so that it is possible to determine information about a current condition of these components, in particular a wear condition. In this case, two of the components in each case oppose each other with surfaces that define the receiving chamber. At least two of the components may be displaced not only in a first direction toward and away from each other but also in a second direction transverse, preferably perpendicular, thereto. In the first direction, the two components may be displaced until they come into direct or indirect stop contact with each other. A position at which such a stop contact occurs and at which a predetermined maximum force acts between the two components may be detected as a stop position. By determining stop positions for at least two, preferably a plurality of, different positionings of the two components with respect to the second direction, it is possible to determine a kind of height profile or surface profile which reflects stop positions in the first direction for different positionings of the two components relative to each other in the second direction. From such a height profile or surface profile, it is possible to determine information about the current condition of the components, in particular information about a current condition of at least one surface of the surfaces opposing each other of both components.

Possible details of embodiments of the method proposed herein and of the ultrasonic welding device configured for its execution are explained below.

The ultrasonic welding device described herein is configured to weld together joining partners, which are accommodated in its receiving chamber, by transmitting ultrasonic energy to the joining partners. In this case, the receiving chamber is surrounded by components of the ultrasonic welding device at least from two opposing sides, preferably even from four sides in a ring shape. Thus, the components define the typically cuboid receiving chamber on at least two sides, preferably on four sides. The joining partners may then be inserted into the receiving chamber from typically two sides which remain open.

Specifically, at least one sonotrode and further components, such as, in particular, an anvil, a touching element and a lateral slide, serve as components around the receiving chamber. The sonotrode may be vibrated ultrasonically by a vibration generator. A surface of the sonotrode directed toward the receiving chamber may be textured, i.e. provided with a profile, so as to be able to transmit the ultrasonic vibrations efficiently to the joining partners. This surface of the sonotrode defines the receiving chamber, according to the definition used herein, on its first side. The anvil is generally located opposite the sonotrode. This may serve on the second side of the receiving chamber as a counter bearing for the joining partners, so that the joining partners may be clamped between the sonotrode and the anvil during the welding operation. A surface of the anvil directed toward the receiving chamber may also be textured. Typically perpendicular to the direction in which the sonotrode and the anvil face each other, the touching element and the lateral slide face each other and with their surfaces define the receiving chamber on its third and fourth side, according to the definition. The term "touching element" is to be interpreted broadly in this context and may refer to both a touching plate and a further lateral slide, toward the surface of which the first lateral slide may be moved so as to narrow the width of the receiving chamber in this way, in order to restrict joining partners accommodated therein from the side. Surfaces of the touching element and the lateral slide directed toward the receiving chamber are typically smooth, but in some applications may also have a surface texture such as corrugation.

The components defining the receiving chamber are displaceable relative to each other within predetermined degrees of freedom. For example, typically the sonotrode and the anvil may be moved relative to each other, toward or away from each other. In this case, the sonotrode may remain stationary and the anvil may be moved or, alternatively, the anvil may remain stationary and the sonotrode may be moved or, as a further alternative, both the sonotrode and the anvil may be moved. Furthermore, typically the touching element and the lateral slide may be moved relative to each other, toward or away from each other. Here too, one of the two components may remain stationary and the other may be displaced or, alternatively, both components may be displaced.

A displacement direction in which two opposing components are displaced toward or away from each other is generally referred to herein as a first displacement direction. The first displacement direction with respect to the displacement of the sonotrode relative to the anvil extends transverse, preferably perpendicular, to the first displacement direction with respect to the displacement of the touching element relative to the lateral slide. The receiving chamber may be narrowed or widened by displacing opposing components in their respective first displacement direction.

In this case, the ultrasonic welding device is configured in such a manner that a first component and a second component opposing it are displaceable relative to each other in their first displacement direction in such a manner that a counterforce, which acts on the component contrary to the first displacement direction during displacement, reaches a predetermined maximum force, but preferably does not exceed the predetermined maximum force. In other words, the two components may be displaced until they come into direct or indirect stop contact with each other. It is possible to detect when the stop is reached and a position of the components assumed in the process. This may be achieved, for example, in that a drive, which may be used to displace one or both of the components, is able to exert at least the predetermined maximum force, preferably is able to exert at most the predetermined maximum force. Alternatively, a sensor system may be provided, which may be used to measure the counterforce and with which the drive is limited or stopped on exceeding the predetermined maximum force. The position assumed on reaching the stop may be read out, for example, from a control system which controls a drive of the components, or may be recorded by means of a position sensor.

At least one or some of the components are, in addition to being displaceable in the first displacement direction, also displaceable in a second displacement direction extending transverse thereto, preferably perpendicular thereto. In other words, such a component is not only displaceable with its surface defining the receiving chamber toward the component opposite it, i.e. orthogonal to this surface, but also transverse, in particular perpendicular, thereto. In this case, the second displacement direction may preferably extend parallel to the surface of the component in question which defines the receiving chamber.

To obtain desired information about the current condition of one or more components of the ultrasonic welding device, it is possible to use the previously described displacement capabilities of the components and the ability to detect a direct or indirect stop contact between components moving relative to each other and toward each other.

For this purpose, a first and a second component are moved toward each other in their first displacement direction. For example, the anvil as the first component may be moved toward the sonotrode as the second component. The anvil, for example, may be arranged above the sonotrode so that the first displacement direction extends vertically downward. The displacement movement in this case may start from an initial position in which the first component and the second component are initially positioned. The two components are moved toward each other in the first displacement direction until they come directly or indirectly into contact with each other, so that a counterforce is built up in the direction contrary to the displacement. As soon as this counterforce reaches the predetermined maximum force, it is assumed that the two components have come directly or indirectly into stop contact with each other. Therein, a position or relative position assumed by one of the two or by both components is detected and registered as the first stop position.

After registering the first stop position, a second stop position is determined. For this purpose, the two components may first be moved slightly away from each other in the first displacement direction, in order to release the stop contact previously assumed. Subsequently, the two components may be displaced relative to each other in the second displacement direction until they assume a changed position. In other words, the two components may be offset relative to each other in a transverse direction, i.e. preferably parallel to their opposing surfaces. Starting from this changed position or relative positioning, the two components are then moved toward each other again in the first displacement direction in a further displacement operation until the counterforce reaches the predetermined maximum force and thus a stop contact is detected. The position assumed by one of the components or the relative position of both components is detected and registered as the second stop position.

Based on the first and second stop positions registered in this way, it is then possible to draw conclusions about the condition information to be determined. For example, as described in greater detail below, it is possible to detect where the first stop position is located relative to the second stop position and to draw conclusions about the condition of components within the ultrasonic welding device from this relative positioning.

Alternatively, as also described in greater detail below, a plurality of pieces of condition information may be determined over time and compared with each other in order to draw conclusions about wear that has occurred in the meantime from any changes.

For example, it may be detected if the second stop position differs greatly from the first stop position with respect to the first displacement direction, and this may be detected as an indicator for the presence of a height difference. The height difference may result, for example, from a step or recess which is located on one of the surfaces of the first and/or second component which come into contact. Such a step or recess may be the result of a wear effect and a height of the step or depth of the recess may make it possible to draw conclusions about any local wear present. Thus, it may already be possible to draw conclusions about the presence of excessive wear based on a single determination of the condition information.

Alternatively or in addition, it is possible to observe how the two stop positions change in the course of time and to draw conclusions from this about the current condition of the components. For example, it may be detected that one or both stop positions shift over time and/or their relative positions with respect to each other change over time. This may be taken as an indicator that the surfaces of the two components coming into contact change over time, for example due to wear. In this case, the change in the stop positions over time may provide a gauge for the wear that has already occurred. For example, currently determined condition information may be compared with a previously known initial condition, in particular a new condition, or a limit condition above which excessive wear is to be assumed.

According to one embodiment, in the method according to the first aspect of the invention, the method steps (b) and (c) are repeated several times in order to detect a plurality of second stop positions for various positions of the first component relative to the second component. In method step (d), the condition information is then determined based on the first stop position detected and the plurality of second stop positions.

In other words, the first and the second components are preferably displaced into changed positions several times in the second displacement direction and then the stop position is determined there in each case by moving both components in the first displacement direction until they reach a stop. In this manner, it is possible to determine stop positions at a plurality of points along the surfaces at which the first and the second components converge with their sides directed toward each other. Overall, this allows a kind of height profile or surface profile to be recorded along these surfaces. Such a height profile or surface profile contains information that allows conclusions to be drawn about wear on the surfaces concerned or, more generally, the shape of these surfaces, so that it is possible to draw qualitative or even quantitative conclusions about the current condition of the component(s) concerned.

According to one embodiment, in method steps (a) and (c), the first component and the second component are displaced relative to each other until a surface of the first component opposing the second component contacts the second component.

In other words, to determine the stop positions, the two components may be moved toward each other until they touch directly. The resulting direct contact between the opposing surfaces of both components then means that a significant counterforce counteracts a further displacement along the first displacement direction, so that as soon as this counterforce reaches the predetermined maximum force, the corresponding stop position may be detected.

Alternatively, according to one embodiment, a matrix element may be introduced into the receiving chamber before executing the method step (a) and/or the method step (c). In the method steps (a) and (c), the first component and the second component may then be displaced relative to each other until the matrix element contacts the first component with a surface directed toward the first component and contacts the second component with a surface directed toward the second component.

The matrix element is a body which fits into the receiving chamber and fills a partial volume of the receiving chamber. The matrix element may also be referred to as a template. The matrix element may be temporarily introduced into the receiving chamber for carrying out the method described herein, for example, by an operator or a machine pushing the matrix element into the receiving chamber from one of the open sides. In this case, the matrix element is preferably sufficiently dimensionally stable so that it does not deform or does not deform significantly under forces acting on the matrix element, at least up to the predetermined maximum force. For example, the matrix element may be a solid body or a hollow body, for example made of a material capable of withstanding mechanical stress, such as a metal. Accordingly, the first and the second components, when they are moved toward each other, may clamp the matrix element between them, i.e. they may indirectly come into stop contact with each other via the matrix element. The counterforce acting here is then transmitted to the respective other components via the matrix element. As soon as the counterforce reaches the predetermined maximum force, the respective stop position is detected. In this case, the stop position refers to positions of the two components with respect to the matrix element arranged between them. The stop position may be determined accurately for both components since dimensions of the matrix element may be measured very accurately or may be known in advance.

According to a detailed embodiment, the matrix element may be attached to either the first component or the second component.

In other words, the matrix element may be temporarily attached to one of the components to be displaced toward each other while the method described herein is being carried out, so that the matrix element is positioned or displaced together with this component. For example, the matrix element may be attached to the sonotrode so that it protrudes toward the anvil from a surface of the sonotrode directed toward the anvil. While the matrix element is thus fixed in position relative to the sonotrode, the anvil may be moved relative to the sonotrode, and thus relative to the matrix element, in the second displacement direction. In particular, the matrix element may be configured in such manner that it may be attached to the component releasably and/or without tools.

According to a further detailed embodiment, the matrix element has a smaller width on a side which is directed toward the first component or the second component than the surface of the first or second component contacted by the matrix element.

In other words, the matrix element may have a smaller width on a side which is directed toward one of the components, with respect to which the stop position is to be determined, than that surface of the respective component which is to be contacted by the matrix element. For example, a matrix element, with the aid of which the surface of the sonotrode that is directed toward the receiving chamber is to be scanned, may be narrower on that side of the matrix element which is directed toward the sonotrode than the surface of the sonotrode to be scanned. Thus, when the first and the second components are moved toward each other, the matrix element may make contact with the opposing component over a substantially narrower surface area than would be the case if the components came into direct contact with each other. The narrow side of the matrix element may thus "scan" the surface of the first or the second component over a small area, similar to a sensor or a probe.

According to a further detailed embodiment, the matrix element may have a greater width on a side directed toward the first component or on a side directed toward the second component than on a side opposite thereto.

In other words, the matrix element may have one broad and one narrow side. The narrow side, for example, may have a width of less than 50%, preferably less than 20% or even less than 10%, of the width of the broad side. In other words, the narrow side of the matrix element, for example, may be less than half the width, preferably less than 20% of the width or even less than 10% of the width, of the surface on which the matrix element rests. The narrow side, for example, may be configured as a narrow protrusion, as a narrow bulge or as a point on the matrix element. For example, with the broad side the matrix element may lie against the first or second component and rest on it and possibly be attached to the component. The narrow side may be directed toward the surface of the respective other component and contact this surface only over a small area to detect the stop position. Accordingly, with its narrow side, for example, the matrix element may also penetrate into small or narrow local recesses, so that a stop position may be detected with respect to such recesses.

Previously, the displacement possibilities of the various components within the ultrasonic welding device were described in very general terms. In principle, it should be possible to displace at least one of two opposing components in its respective first displacement direction toward the opposite component. I.e., it should be possible to displace a component, such as the anvil, which is located above its opposing component, such as the sonotrode, vertically downward in the first displacement direction and/or it should be possible to displace the other component vertically upward. It should be possible to displace a component, such as the lateral slide, which is located laterally adjacent to its opposing component, such as the touching element, horizontally in the first displacement direction toward the other component. In addition, at least one of the components or preferably two or more components may have a further degree of freedom of movement to the effect that the component may also be displaced in the second displacement direction. In this case, the components may be displaced, for example, by servomotors and controlled by a control system.

However, in the specific design of the ultrasonic welding device, such general displacement possibilities may be restricted, i.e. not every one of the components may be displaceable independently of all the other components. Instead, individual ones of the components may cooperate with each other and be displaced together at least in individual displacement directions.

According to one embodiment, for example, the anvil may be displaceable relative to the sonotrode in a first direction and transverse thereto in a second direction, the touching element may be fixed to the anvil in the first direction and displaceable relative to the anvil in the second direction, and the lateral slide may be held stationary relative to the sonotrode in the first direction and displaceable relative to the sonotrode in the second direction.

In other words, the various components within the ultrasonic welding device may each be displaced in different ways by one or more actuators, such as servomotors, and may be guided in their movement in different ways. In the embodiment described, the anvil may be displaced in both the first and the second direction. In particular, the anvil may be displaced independently of the position of the sonotrode and independently of the position of the lateral slide. However, the touching element cooperates with the anvil in such a manner that it is fixed to the anvil in the first direction and thus may only be moved together with the anvil in the first direction. In the second direction, however, the touching element may be displaced relative to the anvil. The lateral slide, in turn, may be held with respect to the sonotrode in such a manner that it remains stationary relative to the sonotrode. If the sonotrode itself is fixed stationary, the lateral slide thus also remains stationary with respect to the first direction. However, the lateral slide may be displaced transverse thereto in the second direction relative to the sonotrode.

The configuration of the components described and their degrees of freedom of movement may be implemented in the ultrasonic welding device in an advantageous manner, for example in that the anvil is arranged above the sonotrode and may be moved in the first and the second direction by means of two actuators. In this case, the first direction corresponds to the vertical and the second direction to the horizontal. The touching element is attached to the anvil and is moved together with it in the first direction but, in addition, may be displaced in the second direction, i.e. horizontally, independently of the anvil by its own actuator. The sonotrode may be held stationary in the ultrasonic welding device and thus does not necessarily need to have a displacement actuator. The lateral slide may be displaced relative to the sonotrode in the second direction and have an actuator for this purpose.

In such a configuration of the ultrasonic welding device, according to a detailed embodiment, in method step (a) the anvil, starting from the initial position, may be displaced in the first direction toward the sonotrode, in method step (b) the anvil may be displaced in the second direction to the changed position, and in method step (c) the anvil, starting from the changed position, may be displaced in the first direction toward the sonotrode.

Overall, the anvil may thus be moved into different lateral positions, i.e. positions at different positioning points along the second direction, and there in each case may then be displaced until in stop contact with the sonotrode. In this manner, an overlap region between the sonotrode and the anvil may be progressively scanned. The stop positions recorded in the process may reproduce a height profile of the sonotrode and/or the anvil in this overlap region. This height profile may contain information about the surface geometry on the sonotrode and/or the anvil and thus enable information about the condition of these components to be determined.

Alternatively, in a detailed embodiment, a matrix element may be introduced into the receiving chamber before executing the method step (a) and/or the method step (c). In method step (a) the lateral slide, starting from the initial position, may be displaced in the second direction toward the touching element, in method step (b) the touching element may be displaced in the first direction to the changed position, and in method step (c) the lateral slide may be displaced in the first direction toward the touching element in the changed position.

Overall, the lateral slide may thus be moved into different height positions, i.e. positions at different positioning points along the first direction, relative to the touching element, and there in each case may then be displaced in the second direction until in indirect stop contact with the touching element, i.e. displaced so far toward the touching element until it abuts upon the matrix element located therebetween. In this manner, an overlap region between the lateral slide and the touching element may be progressively scanned.

In this case, the matrix element may advantageously be configured in such a manner, i.e. provided, for example, with a protrusion directed toward the touching element, that any unevenness in the touching element may be detected over a small area. The stop positions recorded in the process may reproduce a surface profile of the touching element and/or the lateral slide in the overlap region. This surface profile may contain information about the surface geometry on the touching element or on the lateral slide and thus enable information about the condition of these components to be determined.

According to one embodiment, the condition information determined in the method is examined for typical characteristics which indicate a previously known condition of at least one of the components. On detecting a typical characteristic, an operation is initiated that is selected from the group comprising:

initiating maintenance of the ultrasonic welding device;
  initiating replacement of at least one of the components of
    the ultrasonic welding device;

calculating a remaining service life of at least one component of the ultrasonic welding device, optionally taking into account the typical characteristic detected;

emitting a signal indicating the presence of the previously known condition;

verifying correct use of the components used in the ultrasonic welding device;

taking a camera image of at least one component of the ultrasonic welding device;

In other words, the condition information previously determined from the at least two stop positions detected may be analyzed to determine whether the stop positions have typical values that are characteristic of a predetermined condition of one of the components. In this case, the values may be absolute values or relative values between the respective stop positions. For example, it may be analyzed whether the absolute values of the stop positions exceed or fall short of predetermined limit values. In particular, the absolute values may be compared, for example, with predetermined reference values. For example, the behavior of the absolute values may be characteristic of certain signs of wear on the components and/or of certain geometric characteristics of the components. Alternatively, the differences between stop positions, in particular between adjacent stop positions, may be analyzed. Such differences may be characteristic of certain conditions of the components to be determined, in particular of certain signs of wear and/or geometric characteristics of the components.

If, based on such an analysis, it is identified, for example, that it is highly probable that excessive wear has occurred on a component, one or more operations may be initiated, i.e. suitable measures may be set in motion.

For example, it may be arranged for a technician to maintain the ultrasonic welding device. In this case, the technician may check the condition information determined in the course of the method presented by inspecting the ultrasonic welding device on site. If excessive wear is detected, for example, or if it is identified that a predefined wear limit has been reached, then corrective maintenance may be carried out in the course of which worn components may be reworked, for example.

Alternatively, one or more of the components may also be replaced as a response to the condition information determined.

Furthermore, knowledge about a typical characteristic of the condition information may also be used to determine any remaining service life of one or more components of the ultrasonic welding device. In this case, the typical characteristic detected may be taken into account, if necessary. For example, based on the condition information determined, conclusions may be drawn about wear that has already occurred on a component. If this wear may be quantifiably derived from the condition information, it is possible to draw conclusions about further wear possible in the future and thus to analyze how long the affected component may still be expected to remain in working order before it has to be replaced or repaired. Such information may be used in the context of predictive maintenance, for example to enable planning maintenance operations in advance.

In addition, a corresponding signal may be emitted in the event that a previously known characteristic condition is detected by analyzing the condition information. For example, this signal may provide an operator of the ultrasonic welding device or a technician with information that alerts them to the detected condition. For example, a signal may be emitted in a visual and/or acoustic manner to signal to the operator or technician that the ultrasonic welding device should be maintained or that such maintenance is imminent. Alternatively or in addition, a signal may be transmitted to another machine or a monitoring center.

As a further possible response to detection of the typical characteristic, it is possible to verify correct use of the components used in the ultrasonic welding device. For example, it may be provided that different components are used in the ultrasonic welding device for different application purposes. For example, it is possible to use certain sonotrodes and/or anvils that have an application-specific shape, for example in the shape of a so-called Dombie nose, for certain welding applications. This shape may be detected when determining the stop positions and the height profile or surface profile resulting from it, so that it may be automatically decided whether a component with a desired profile has actually been installed in the ultrasonic welding device.

Furthermore, detecting the typical characteristic may cause activation of a camera to capture an image of at least one of the components in the ultrasonic welding device. The camera may be integrated in the ultrasonic welding device and be suitably configured, for example, to be capable of taking an image of a surface of a component that is potentially subject to wear. The image taken by the camera may be used for visual inspection of the component and, for example, supplementary analysis of the image may verify a condition of the component identified as probable within the scope of the method presented herein, in particular wear of the component. If required, the images may be documented or archived and/or analyzed in a supplementary manner.

According to a further embodiment, the condition information may be determined several times at successive times during operation of the ultrasonic welding device as an alternative or in addition to inspection for the presence of typical characteristics which is described above. The pieces of condition information determined are compared for typical changes which indicate a previously known condition of at least one of the components. On detecting a typical change, an operation is initiated which may be selected from the group of possibilities that has already been explained for the preceding embodiment.

In other words, the condition information may be determined several times in succession by detecting the at least two stop positions in each case at different times. If the surfaces and/or the position of the components, with respect to which the stop positions are detected, change over time, the stop positions will also change accordingly. By comparing currently recorded stop positions with previously recorded stop positions, it is thus possible to draw conclusions about such changes. For example, it is possible from this to derive information about any wear that has occurred in the meantime.

Embodiments of an ultrasonic welding device according to the second aspect of the invention are configured to carry out or control the method described herein. For this purpose, the ultrasonic welding device may comprise a control system which controls actuators, for example, which may be used to displace the components of the ultrasonic welding device in their first and/or second displacement direction in a targeted and controlled manner. The actuators may be configured in various ways, for example as precisely displaceable actuators, servomotors, pneumatic drives, hydraulic drives or the like. The control system may comprise a microelectronic circuit which may be used to generate and transmit control signals to the actuators. In particular, the control system may be programmable. For this purpose, the control system may have a processor and a data storage device. The controller may additionally have sensors or communicate with sensors.

The control system may be programmed using a computer program product according to the third aspect of the invention, in order to carry out or control the method described herein in the ultrasonic welding device. The computer program product may be programmed in any computer language.

The computer program product may be stored on a machine-readable medium according to the fourth aspect of the invention. Such a machine-readable medium, for example, may be a portable medium. It may store data preferably in the non-volatile memory. For example, the medium may be a flash memory, a CD, a DVD, a ROM, an EPROM or the like. Alternatively, the medium may be part of a computer or server. In particular, the medium may be part of a cloud. Accordingly, the computer program product may be read or downloaded from the machine-readable medium, for example via a network such as the internet.

It should be noted that possible features and advantages of embodiments of the invention are explained herein partly with reference to an ultrasonic welding device and partly with reference to an operating method for an ultrasonic welding device. A person skilled in the art will recognize that the features described for individual embodiments may be transferred to other embodiments in an analogous and suitable manner, may be adapted and/or interchanged to arrive at further embodiments of the invention and possibly synergistic effects.

BRIEF DESCRIPTION OF THE DRAWINGS

Advantageous embodiments of the invention are further explained below with reference to the accompanying drawings, and neither the drawings nor the explanations are to be construed as limiting the invention in any way.

The figures are merely schematic and not true to scale. Identical reference numerals in the various drawings denote identical features or features having the same effect.

DETAILED DESCRIPTION

Figure 1:
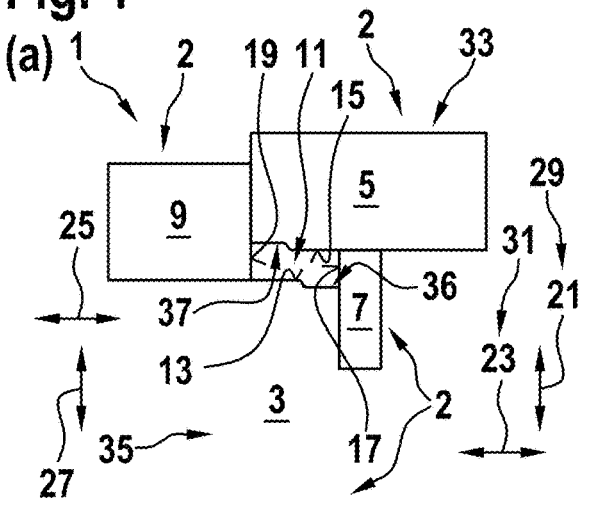
FIG. 1(a) shows a view of components of an ultrasonic welding device in various configurations, during successive steps of a method according to an embodiment of the invention for recording a height profile on the sonotrode and/or on the anvil.
FIG. 1(b) shows a view of components of an ultrasonic welding device in various configurations, during successive steps of a method according to an embodiment of the invention for recording a height profile on the sonotrode and/or on the anvil.
FIG. 1(c) shows a view of components of an ultrasonic welding device in various configurations, during successive steps of a method according to an embodiment of the invention for recording a height profile on the sonotrode and/or on the anvil.
FIG. 1(d) shows a view of components of an ultrasonic welding device in various configurations, during successive steps of a method according to an embodiment of the invention for recording a height profile on the sonotrode and/or on the anvil.
FIG. 1(e) shows a view of components of an ultrasonic welding device in various configurations, during successive steps of a method according to an embodiment of the invention for recording a height profile on the sonotrode and/or on the anvil.
FIG. 1(f) shows a view of components of an ultrasonic welding device in various configurations, during successive steps of a method according to an embodiment of the invention for recording a height profile on the sonotrode and/or on the anvil.
Figure 1:
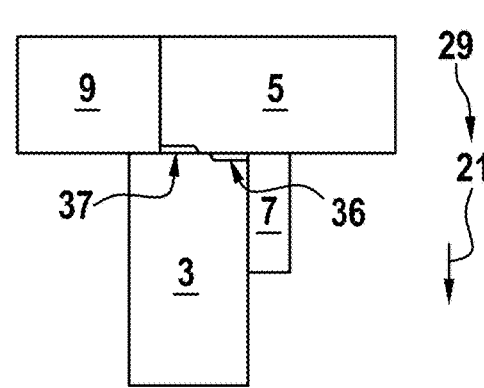
Figure 1:
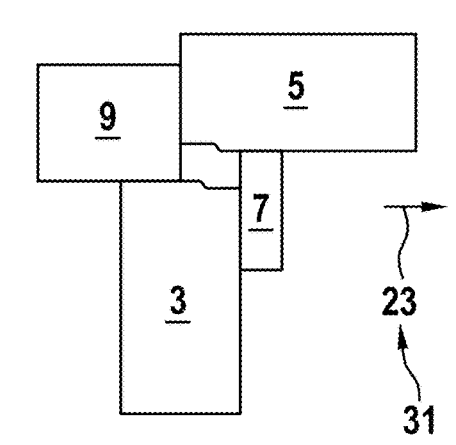
Figure 1:
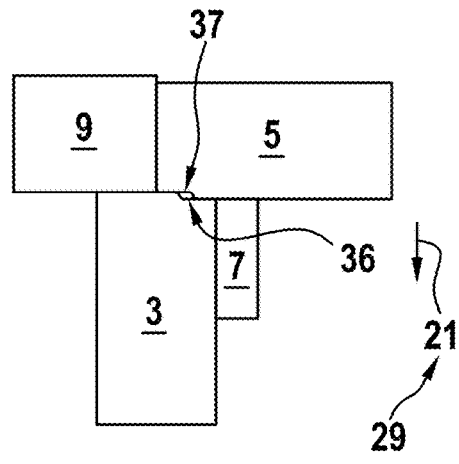
Figure 1:
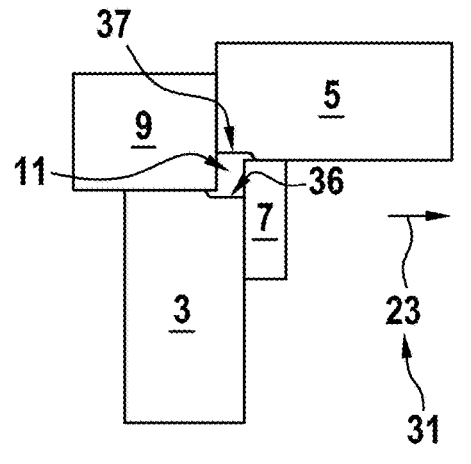
Figure 1:
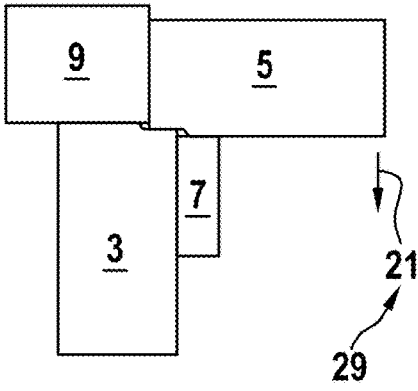

FIG. 1 shows an ultrasonic welding device 1 at various stages during the performance of a method for determining condition information according to an embodiment of the present invention.

The ultrasonic welding device 1 comprises a plurality of components 2 which are displaceable relative to one another. In particular, the ultrasonic welding device 1 comprises a sonotrode 3, an anvil 5, a touching element 7 and a lateral slide 9. These components 2 surround a receiving chamber 11 in which joining partners (not shown) may be accommodated in order to subsequently weld them together. In this case, the receiving chamber 11 is defined on a first side from below by a surface 13 of the sonotrode 3 and on a second side opposing the first side from above by a surface 15 of the anvil 5. The receiving chamber 11 is further defined on a third side from the right by a surface 17 of the touching element 7 and on a fourth side opposing the third side on the left by a surface 19 of the lateral slide 9.

At least some of the components 2 are displaceable relative to others of the components 2. For this purpose, the relevant components 2 may be driven, for example, by an adjusting drive which is controlled by a control system (not shown in each case).

In the example shown, the anvil 5 may be displaced vertically relative to the sonotrode 3 in a first displacement direction 21. In the configuration shown in FIG. 1, the vertical first displacement direction 21 is also referred to as first direction 29. In addition, the anvil 5 may be displaced relative to the sonotrode 3 in a second displacement direction 23. The horizontal second displacement direction 23 is also referred to as second direction 31 in the configuration shown. The touching element 7 is fixed to the anvil 5 in the first direction 29, but may be displaced relative to the anvil 5 in the second direction 31. The lateral slide 9 is held stationary relative to the sonotrode 3 in the first direction 29, but may be displaced relative to the sonotrode 3 in the second direction 31. In this case, the lateral slide 9 may be moved relative to the touching element 7 opposite it in a horizontal first displacement direction 25. In addition, by displacing the touching element 7 together with the anvil 5 in vertical direction 29, the lateral slide 9 and the touching element 7 may be moved relative to each other in a second displacement direction 27.

Here, mutually opposing components 2 may be displaced relative to each other in such a manner that a counterforce acting between these components 2, which is generated when the components 2 come directly or indirectly into stop contact with each other, may reach a maximum force. When this maximum force is reached, it may thus be concluded that the relevant components 2 have come into contact with each other. A position assumed in this process by one or both of the components 2 may be detected as a stop position.

With respect to FIGS. 1(*a*) to (*f*), a sequence of method steps will now be explained, by means of which condition information may be determined which provides information about the current condition of at least one of the components 2. In the example shown, information about a geometry of the surface 13 of the sonotrode 3 directed toward the anvil 5 and/or of the surface 15 of the anvil 5 directed towards the sonotrode 3 is to be determined as condition information. In this case, the anvil 5 is referred to as first component 33, whereas the opposing sonotrode 3 is referred to as second component 35.

As shown in FIG. 1(*a*), in an initial configuration, the components 2 are arranged in such a manner that the anvil 5 with its surface 15 is at a distance from the sonotrode 3 with its surface 13, and the touching element 7 with its surface 17 is at a distance from the lateral slide 9 with its surface 19, so that the receiving chamber 11 is relatively large.

Starting from this configuration, as illustrated in FIG. 1(*b*), the anvil 5 together with the touching element 7 held thereon is displaced vertically toward the sonotrode 3 in the first displacement direction 21 until both components 2 come into stop contact with each other, i.e. in this case touch directly, so that a counterforce counteracts a further displacement of the anvil 5. As soon as this counterforce reaches a predetermined maximum force, the position assumed in the process by the anvil 5 is recorded as the first stop position.

Then, as shown in FIG. 1(*c*), the anvil 5 is removed from the sonotrode 3 again. Subsequently, the anvil 5 is displaced relative to the sonotrode 3 in the horizontal second displacement direction 23 into a changed position. For this purpose, the lateral slide 9 may be moved toward the touching element 7 in the second displacement direction 23.

Starting from this changed position, the anvil 5 is then once again displaced vertically toward the sonotrode 3 in the displacement direction 21, as illustrated in FIG. 1(*d*). As soon as both components 2 come into stop contact and the counterforce reaches the predetermined maximum force, the second stop position is detected.

The method steps shown in FIGS. 1(*c*) and (*d*) may be repeated several times, if necessary, and in this process the anvil 5 may be gradually displaced further and further in the horizontal second displacement direction 23 and stop positions determined in each case.

FIGS. 1(*e*) and (*f*) show a configuration in which the anvil 5 has already been displaced so far in the horizontal second displacement direction 23 that the surface 15 of the anvil 5 and the surface 13 of the sonotrode 3 only slightly overlap laterally. In this configuration, the receiving chamber 11 thus has only a small width, it being possible for the width to correspond approximately to the width typically occupied during the welding of joining partners. During welding, wear may occur on the components 2 due to pressure and friction exerted in the process. As shown in FIGS. 1(*a*)-(*f*), for example, a recess 36 or a notch may appear on the surface 13 of the sonotrode and/or a recess 37 or a notch may appear on the surface 15 of the anvil 5 due to such wear. Since, in the configuration shown, the anvil 5 and the sonotrode 3 now only overlap in one region in which at least one of these recesses 36, 37 is located, contact between the anvil 5 and the sonotrode 3 occurs at a slightly different stop position than was the case for the previous configurations (as shown in FIGS. 1(*a*)-(*d*)). This difference in the measured stop position may thus provide information regarding the one or two recesses 36, 37 created by wear.

Figure 2:
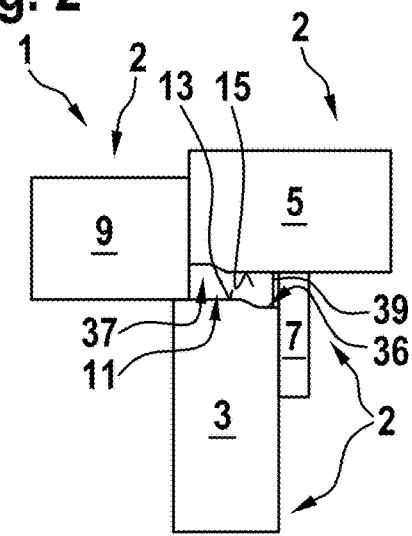
FIG. 2(a) shows a view of components of an ultrasonic welding device with a matrix element inserted in the receiving chamber in various configurations, during successive steps of a method according to an embodiment of the invention for recording a height profile on the anvil.
FIG. 2(b) shows a view of components of an ultrasonic welding device with a matrix element inserted in the receiving chamber in various configurations, during successive steps of a method according to an embodiment of the invention for recording a height profile on the anvil.
FIG. 2(c) shows a view of components of an ultrasonic welding device with a matrix element inserted in the receiving chamber in various configurations, during successive steps of a method according to an embodiment of the invention for recording a height profile on the anvil.
Figure 2:
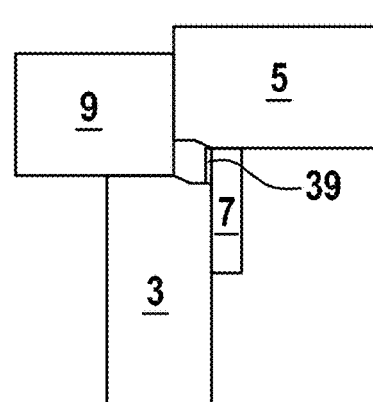
Figure 2:
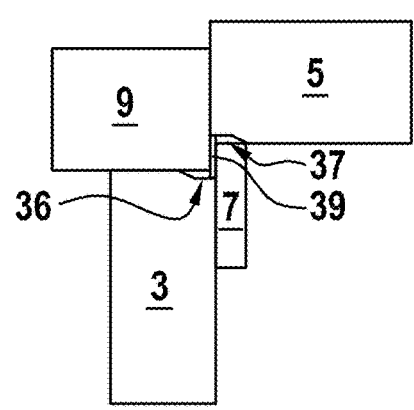

FIGS. 2(*a*)-(*c*) show an alternative embodiment of the method described herein in which a matrix element 39 is inserted into the receiving chamber 11 between the components 2 of the ultrasonic welding device 1. In the example shown, the matrix element 39 may be attached to the sonotrode 3, for example. For example, the matrix element 39 may be arranged on an edge of the sonotrode 3 which is furthest away from the lateral slide 9. In this case, the matrix element 39 may be arranged on the surface 13 of the sonotrode in the region of a wear-induced recess 36. Here, the matrix element 39 may protrude upward above the surface 13 of the sonotrode 3 toward the anvil 5. The matrix element 39 preferably has a small width to enable it to touch or scan the opposite surface 15 of the anvil 5 locally in a narrow region. In particular, the width of the matrix element 39 may be smaller than the width of the surface 15 of the anvil 5 to be contacted therewith.

In the alternative embodiment shown in FIG. 2, the anvil 5 and the sonotrode 3 are moved vertically toward each other several times, similarly to the embodiment shown in FIG. 1, and in each case are displaced horizontally into different positions relative to each other in between. However, in this case, the anvil 5 with its surface 15 does not come into direct contact with the surface 13 of the sonotrode 3. Instead, as both components 2 approach each other, the matrix element 39 is clamped between them and with its upper and lower ends touches the mutually opposing surfaces 13, 15 of the sonotrode 3 and anvil 5. The clamping of the matrix element 39 results in an increase in the counterforce caused when the two components 2 approach each other, so that if the predetermined maximum force is exceeded, a stop position may be accurately determined even in this case. As may be seen in particular in FIG. 2(*c*), in this case it is possible, due to the small width of the matrix element 39, to detect even narrow recesses 36, 37 on the surfaces 13, 15 which come into contact.

Figure 3:
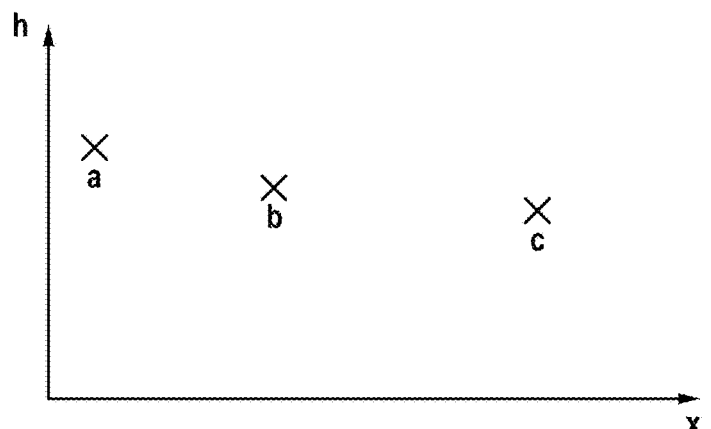
FIG. 3 shows a height profile as recorded by means of the method according to an embodiment of the invention.

FIG. 3 shows a height profile such as may be recorded using the method described herein. Here, stop positions a, b, c were determined at corresponding heights h at various positions x along the horizontal displacement direction 23. In this case, the various positions correspond to the configurations as shown in FIGS. 1(*b*), (*d*), (*f*) or FIGS. 2(*a*), (*b*), (*c*) respectively. It may be seen that the last recorded data point c indicates a lower height than the preceding data points a, b. From this it may be concluded that when the data point c was recorded, the anvil 5 and the sonotrode 3 could have been moved further towards each other than when the other data points were recorded. This may be identified as a typical characteristic of a condition prevailing in one of the components 2, for example the anvil 5, in the form of a local recess 37 in the region around the position (c). Such a condition may be previously known and typical of signs of wear such as may occur in ultrasonic welding devices 1.

If more than the three data points shown in the example are recorded, the data points may even indicate a sufficiently high-resolution height profile from which it is possible to derive information about the position, width, depth and/or geometry of one or two recesses 36, 37 as condition information.

Alternatively or in addition, condition information may also be recorded at successive points in time. For example, the method described herein may be carried out regularly at predetermined intervals or according to a predetermined period of operation and the stop positions stored as condition information. Alternatively, the method may be carried out periodically after a predetermined number of welding operations have been completed or after it has been determined that a predetermined quantity of energy has been consumed by welding operations carried out in the meantime, and the stop position may be stored as condition information. Currently recorded condition information may be compared in the process with previously stored condition information. From changes observed in this case, it is possible to draw conclusions about the condition to be monitored for the components 2 within the ultrasonic welding device 1.

If required, the method described herein may be carried out once without the matrix element 39, i.e. as shown in FIG. 1, and once with the matrix element 39, i.e. as shown in FIG. 2. When the method in which no matrix element 39 is accommodated in the receiving chamber 11 is performed, in this case, in the event that the anvil 5 and the sonotrode 3 overlap exclusively in the region of their respective recesses 36, 37 (see FIG. 1(*f*)), height information is generated on reaching the stop position which is influenced by the sum of the two recesses 36, 37 both on the sonotrode 3 and on the anvil 5. In contrast, when the method in which a matrix element 39 is accommodated in the receiving chamber 11 is performed, in the event that the anvil 5 and the sonotrode 3 overlap exclusively in the region of their respective recesses 36, 37, height information is generated on reaching the stop position which, in the example shown, is influenced only by the recesses 37 on the anvil 5. By subtracting both pieces of height information from each other, it is ultimately possible to generate height information which reflects the recess 36 on the sonotrode 3. Instead of fixing the matrix element 39 to the sonotrode 3, as shown in FIG. 2, the matrix element 39 may also be fixed alternatively to the anvil, so that in this case recesses 36 on the sonotrode 3 may then be detected.

On detecting a typical characteristic in condition information or a typical change between condition information items recorded sequentially in time, this may be used as an indicator for changes in one or more of the components 2 and suitable responses may be initiated. For example, a reference value or a reference height profile may be used for comparison. In this case, it may be possible to demonstrate a wear limit. Maintenance may be arranged if the wear limit is exceeded. Preventive maintenance may also be scheduled if, for example, there is an expectation of excessive wear in the near future based on the condition information currently determined. For example, after carrying out a predetermined number of welding operations, the condition information may be determined according to the invention and then an estimate may be made as to how long the components 2 are still to be used. Intermediate steps may also be carried out to create a sort of prediction. Faulty components 2 may be identified in good time.

Overall, it is possible to prevent using a tool for too long. Wear limits may be identified in good time. Servicing and tool changes may be better planned. Human influence may be minimized. With a regulated workflow and maintenance plans, tools may be replaced or reworked in good time. Any noticeable problems may be associated with follow-up tests. For example, on detecting excessive wear on components 2 of the ultrasonic welding device 1, it is also possible to check whether joining partners last welded with the ultrasonic welding device 1 were welded properly. In the event that the determined condition information deviates severely from target values, the ultrasonic welding device may, if necessary, be taken out of operation entirely and/or a suitable signal may be emitted to provide an operator and/or a monitoring system with information about the deviations detected. For example, an acoustic alert may be emitted and/or a warning light may be activated, for example on a traffic light warning system.

Possibly, supplementary to determining the condition information as described herein, a detected change in condition, such as detected local wear on one of the components 2, may be verified in addition via an integrated or external camera system. For example, if a limit is not reached, an image of the profile, for example of the surface 15 of the anvil 5, may be produced. Such an additional visual check may be used to document or also to evaluate further wear patterns.

Alternatively or in addition, the condition information may be used to detect whether a correct component 2, i.e. an anvil 5 with a desired geometry, for example, (i.e. with a Dombie nose, for example) is installed in the ultrasonic welding device 1. Even if components 2 have been replaced in the ultrasonic welding device 1, it is possible to detect whether correct components 2 have been replaced and/or whether they have been properly fitted.

Figure 4:
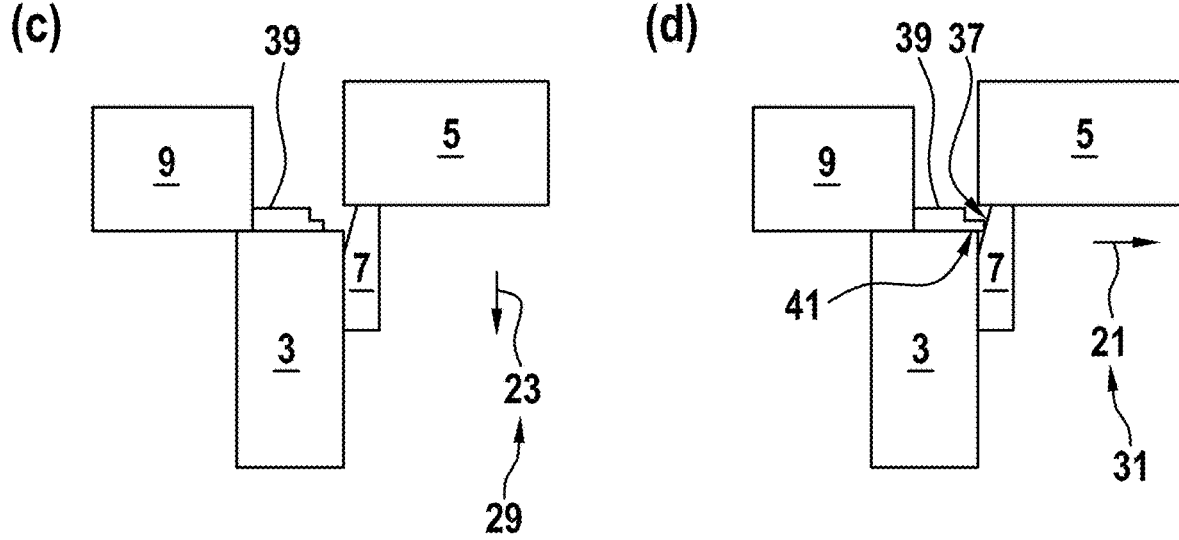
FIG. 4(a) shows a view of components of an ultrasonic welding device with a matrix element inserted in the receiving chamber in various configurations, during successive steps of a method according to an embodiment of the invention for recording a surface profile on the touching element.
FIG. 4(b) shows a view of components of an ultrasonic welding device with a matrix element inserted in the receiving chamber in various configurations, during successive steps of a method according to an embodiment of the invention for recording a surface profile on the touching element.
FIG. 4(c) shows a view of components of an ultrasonic welding device with a matrix element inserted in the receiving chamber in various configurations, during successive steps of a method according to an embodiment of the invention for recording a surface profile on the touching element.
FIG. 4(d) shows a view of components of an ultrasonic welding device with a matrix element inserted in the receiving chamber in various configurations, during successive steps of a method according to an embodiment of the invention for recording a surface profile on the touching element.

FIGS. 4(*a*)-(*d*) illustrate a sequence of steps of a method according to an alternative embodiment. In this case, the method is adapted to determine condition information on the basis of which wear on the touching element 7 in particular may be detected. In this case, the lateral slide 9 is referred to as first component 33, whereas the opposing touching element 7 is referred to as second component 35.

In the embodiment described, a matrix element 39 is inserted into the receiving chamber 11 in a manner similar to that in the previously described embodiment. The matrix element 39 has a greater width B1 on its side directed toward the lateral slide 9 than a width B2 on the opposite side directed toward the touching element 7. In this case the term "width" is to be understood as a dimension in a direction transverse to the first displacement direction 21. The "first displacement direction" 21 is defined generally herein as the direction of movement of the first and second components 33, 35 to be moved relative to each other, i.e. in this case as the direction of movement of the lateral slide 9 or the touching element 7, and thus in this case is directed horizontally.

In the specific example shown, the matrix element 39 is configured in such a manner that it rests over a relatively large area on the surface 19 of the lateral slide 9 which is directed toward the receiving chamber 11 and is preferably attached to the lateral slide 9. There is a protrusion 41 located on the opposite side, which side is directed towards the surface 17 of the touching element 7 that is directed toward the receiving chamber 11. This protrusion 41 has a smaller width B2 or is tapered or pointed. Accordingly, the matrix element 39 with the protrusion 41 may also engage in small recesses 37 which are possibly present on the touching element 7.

FIG. 4(a) shows an initial configuration in which the components 2 are spaced far enough apart from each other so that the matrix element 39 may be inserted in the receiving chamber 11 with sufficient lateral clearance.

From this configuration, as shown in FIG. 4(b), the lateral slide 9 together with the matrix element 39 may be moved in the horizontal, first displacement direction 21 toward the touching element 7 until the protrusion 41 of the matrix element 39 touches the surface 17 of the touching element 7 and the counterforce builds up until the maximum force is reached. Accordingly, a first stop position is detected.

After this first stop contact has been released again by moving the lateral slide 9 back, the touching element 7 is moved vertically downward together with the anvil 5, as shown in FIG. 4(c). In other words, the lateral slide 9 together with the matrix element 39 and the touching element 7 are displaced relative to each other in the vertical second displacement direction 23 into a changed position.

Starting from this changed position, the lateral slide 9 together with the matrix element 39 is then displaced to the right again in the horizontal first displacement direction 21, as shown in FIG. 4(d). With its protrusion 41, the matrix element 39 may thus come into stop contact with the surface 17 of the touching element 7 in the region of the recess 37. In other words, due to the special design of the matrix element 39 with the local protrusion 41, the surface 17 of the touching element 7 may be finely scanned and any wear-induced recesses 37 or roughnesses, for example, may be detected. If the method steps, as shown in FIGS. 4(c) and (d), are repeated several times and the vertical displacement in the second displacement direction 23 takes place in small steps, a sufficiently high-resolution surface profile of the surface 17 of the touching element 7 may be recorded, which may be used to derive detailed information about the current condition of this touching element 7.

Finally, it should be noted that terms such as "having", "comprising", etc. do not exclude any other elements or steps and terms such as "one" or "a" does not exclude a plurality. It should further be pointed out that features or steps which have been described with reference to one of the above exemplary embodiments may also be used in combination with other features or steps of other exemplary embodiments described above. Reference numerals in the claims are not to be regarded as a limitation.

LIST OF REFERENCE NUMERALS

1 Ultrasonic welding device
2 Components
3 Sonotrode assembly

5 Anvil
7 Touching element
9 Lateral slide
11 Receiving chamber
13 Surface of the sonotrode
15 Surface of the anvil
17 Surface of the touching element
19 Surface of the lateral slide
21 First displacement direction of the anvil relative to the sonotrode
23 Second displacement direction of the anvil relative to the sonotrode
25 First displacement direction of the lateral slide relative to the touching element
27 Second displacement direction of the lateral slide relative to the touching element
29 First direction
31 Second direction
33 First component
35 Second component
36 Recess
37 Recess
39 Matrix element
41 Protrusion

The invention claimed is:

1. A method for determining condition information for an ultrasonic welding device, wherein the condition information specifies information about a current condition of at least one component of the ultrasonic welding device, wherein the ultrasonic welding device comprises:
   a plurality of components, comprising at least two of:
   a sonotrode;
   an anvil;
   a touching element; and
   a lateral slide; and
a receiving chamber in which joining partners are to be received;
wherein the receiving chamber is defined on a first side by a surface of a first of the components and on a second side opposing the first side by a surface of a second of the components;
wherein at least the first of the components and the second of the components opposing the first component are displaceable relative to each other in a first displacement direction toward each other and are displaceable relative to each other in a second displacement direction oriented transverse to the first displacement direction;
wherein the first component and the second component are displaceable relative to each other in the first displacement direction in such a manner that a counterforce which acts on the first component contrary to the first displacement direction reaches a predetermined maximum force;
wherein the method comprises the following method steps:
(a) displacing the first component and the second component relative to each other, starting from an initial position, in the first displacement direction and detecting a first stop position at which the counterforce acting on the first component during displacement reaches the predetermined maximum force;
(b) displacing the first component and the second component relative to each other in the second displacement direction into a changed position; and
(c) displacing the first component and the second component relative to each other again, starting from the changed position, in the first displacement direction and detecting a second stop position at which the counterforce acting on the first component during displacement reaches the predetermined maximum force;

(d) determining the condition information based on the first and second stop positions detected.

2. The method according to claim 1,
wherein the method steps (b) and (c) are repeated plural times in order to detect a plurality of second stop positions for various positions of the first component relative to the second component, and
wherein, in method step (d), the condition information is determined based on the first stop position detected and the plurality of second stop positions.

3. The method according to claim 1,
wherein, in the method steps (a) and (c), the first component and the second component are displaced relative to each other until a surface of the first component opposing the second component contacts the second component.

4. The method according to claim 1,
wherein a matrix element is introduced into the receiving chamber before executing at least one of the method step (a) and the method step (c), and
wherein, in the method steps (a) and (c), the first component and the second component are displaced relative to each other until the matrix element contacts the first component with a surface directed toward the first component and contacts the second component with a surface directed toward the second component.

5. The method according to claim 4,
wherein the matrix element is attached to one of the first component and the second component.

6. The method according to claim 4,
wherein the matrix element has a smaller width on a side which is directed toward one of the first component and the second component than one of the surface of the first and second component contacted by the matrix element.

7. The method according to claim 4,
wherein the matrix element has a greater width on one of a side directed toward the first component and a side directed toward the second component than on a side opposite thereto.

8. The method according to claim 1,
wherein the ultrasonic welding device comprises the sonotrode, the anvil and the touching element,
wherein the anvil is displaceable relative to the sonotrode in a first direction and transverse thereto in a second direction,
wherein the touching element is fixed to the anvil in the first direction and is displaceable relative to the anvil in the second direction, and
wherein the lateral slide is held stationary relative to the sonotrode in the first direction and is displaceable relative to the sonotrode in the second direction.

9. The method according to claim 8,
wherein in method step (a) the anvil, starting from the initial position, is displaced in the first direction toward the sonotrode,
wherein in method step (b) the anvil is displaced in the second direction into the changed position, and
wherein in method step (c) the anvil, starting from the changed position, is displaced in the first direction toward the sonotrode.

10. The method according to claim 8,
wherein a matrix element is introduced into the receiving chamber before executing at least one of the method step (a) and the method step (c),
wherein in method step (a) the lateral slide, starting from the initial position, is displaced in the second direction toward the touching element,
wherein in method step (b) the touching element is displaced in the first direction into the changed position, and
wherein in method step (c) the lateral slide is displaced in the second direction toward the touching element in the changed position.

11. The method according to claim 1,
wherein the condition information determined is examined for characteristics which indicate a previously known condition of at least one of the components, and
wherein on detecting a characteristic, an operation is initiated that is selected from the group comprising:
initiating maintenance of the ultrasonic welding device;
initiating replacement of at least one of the components of the ultrasonic welding device;
calculating a remaining service life of at least one component of the ultrasonic welding device;
emitting a signal indicating the presence of the previously known condition;
verifying correct use of the components used in the ultrasonic welding device;
taking a camera image of at least one component of the ultrasonic welding device.

12. The method according to claim 1,
wherein the condition information is determined plural times at successive times during operation of the ultrasonic welding device, and wherein the condition information determined is compared for changes which indicate a previously known condition of at least one of the components, and
wherein on detecting a change, an operation is initiated that is selected from the group comprising:
initiating maintenance of the ultrasonic welding device;
initiating replacement of at least one of the components of the ultrasonic welding device;
calculating a remaining service life of at least one component of the ultrasonic welding device;
emitting a signal indicating the presence of the previously known condition;
verifying correct use of the components used in the ultrasonic welding device;
taking a camera image of at least one component of the ultrasonic welding device.

13. An ultrasonic welding device having:
a plurality of components, comprising at least two of:
a sonotrode;
an anvil;
a touching element; and
a lateral slide; and
a receiving chamber in which joining partners are to be received;
a drive being configured to exert a predetermined maximum force; and
a control system configured for at least one of controlling the drive and reading out a sensor configured to measure a counterforce;
wherein the receiving chamber is defined on a first side by a surface of a first of the components and on a second side opposing the first side by a surface of a second of the components;

wherein at least a first of the components and a second of the components opposing the first component are displaceable by the drive relative to each other in a first displacement direction toward each other and are displaceable relative to each other in a second displacement direction oriented transverse to the first displacement direction;

wherein the first component and the second component are displaceable by the drive relative to each other in the first displacement direction in such a manner that a counterforce which acts on the first component contrary to the first displacement direction does not exceed a predetermined maximum force, wherein the counterforce is measurable by the sensor;

wherein the ultrasonic welding device is configured with the control system to carry out or control the method according to claim 1.

14. A computer program product comprising instructions which, when executed on a processor, prompt the processor to carry out or control the method according to claim 1 in an ultrasonic welding device, the ultrasonic welding device having a plurality of components, comprising at least two of:
a sonotrode;
an anvil;
a touching element; and
a lateral slide; and a receiving chamber in which joining partners are to be received;

wherein the receiving chamber is defined on a first side by a surface of a first of the components and on a second side opposing the first side by a surface of a second of the components;

wherein at least a first of the components and a second of the components opposing the first component are displaceable relative to each other in a first displacement direction toward each other and are displaceable relative to each other in a second displacement direction oriented transverse to the first displacement direction;

wherein the first component and the second component are displaceable relative to each other in the first displacement direction in such a manner that a counterforce which acts on the first component contrary to the first displacement direction does not exceed a predetermined maximum force.

15. A machine-readable medium with a computer program product according to claim 14 stored thereon.

16. The method according to claim 1, wherein the receiving chamber is further defined on a third side by a surface of a third of the components and on a fourth side opposing the third side by a surface of a fourth of the components.

* * * * *